(12) United States Patent
Krigmont

(10) Patent No.: US 7,582,144 B2
(45) Date of Patent: *Sep. 1, 2009

(54) SPACE EFFICIENT HYBRID AIR PURIFIER

(76) Inventor: Henry Krigmont, 3600 Marigold St., Seal Beach, CA (US) 90740

( * ) Notice: Subject to any disclaimer, the term of this patent is extended or adjusted under 35 U.S.C. 154(b) by 0 days.

This patent is subject to a terminal disclaimer.

(21) Appl. No.: 12/009,374

(22) Filed: Jan. 19, 2008

(65) Prior Publication Data

US 2009/0151567 A1 Jun. 18, 2009

Related U.S. Application Data

(63) Continuation-in-part of application No. 12/002,505, filed on Dec. 17, 2007.

(51) Int. Cl.
*B03C 3/016* (2006.01)
(52) U.S. Cl. ............... 96/16; 55/DIG. 38; 96/66; 96/69; 96/97; 96/98; 96/99
(58) Field of Classification Search ............... 96/16, 96/66, 69, 95–100; 55/DIG. 38
See application file for complete search history.

(56) References Cited

U.S. PATENT DOCUMENTS 1,345,790 A 7/1920 Lodge .................. 96/62
(Continued)

FOREIGN PATENT DOCUMENTS

| GB | 2016305 A | * | 9/1979 | .................. 96/98 |
| JP | 5-96 125 A | | 4/1993 | |
| JP | 5-96125 A | | 4/1993 | |

OTHER PUBLICATIONS

U.S. Appl. No. 12/002,505, filed Dec. 17, 2007.
U.S. Appl. No. 11/977,119, filed Oct. 23, 2007.

*Primary Examiner*—Richard L Chiesa
(74) *Attorney, Agent, or Firm*—Clifford Kraft

(57) ABSTRACT

A compact, hybrid particulate and gas collector that can be used in an ultra-clean air purification, vehicle emissions control system, gas turbine, or in any other application where space and lower cost is important or in applications where sub-micron and nano-particulate filtering is needed such as in clean rooms and surgical suites. A gas flow enters the device in a first chamber and can be immediately exposed to a high-tension corona discharge electric field which typically results in a strong ionic flow by charging and collecting the incoming effluent (oil mist, soot particles, etc.). Subsequently, the charged flow enters a second zone of high-tension uniform electric field that causes the remaining charged particles to migrate to one of the charged electrodes. One of the electrodes can be made of porous filter material that allows the cleaned gas to flow into an exit zone also containing a high-tension uniform electric field where the remaining effluent can be collected prior to the ultra-clean gas exiting either to ambient air or being re-circulated to be used again by the engine. In some embodiments a dielectric barrier discharge surface can be provided to convert harmful compounds to more desirable substances. Alternate embodiments can include a third zone containing a second substantially uniform electric field as well as coating the porous surface with a catalyst to convert undesirable compounds. Any cross-section of the device may be used. Further treatment of the dust free flow with ultraviolet light, an x-ray or a radiation can be used to kill micro-organisms.

18 Claims, 9 Drawing Sheets

U.S. PATENT DOCUMENTS

| | | | |
|---|---|---|---|
| 1,356,462 A | 10/1920 | Nesbit | 96/87 |
| 1,605,648 A * | 11/1926 | Cooke | 95/79 |
| 2,654,438 A | 10/1953 | Wintermute | 96/62 |
| 3,248,857 A | 5/1966 | Weindel et al. | |
| 3,440,800 A * | 4/1969 | Messen-Jaschin | 96/52 |
| 3,785,125 A | 1/1974 | DeSeversky | |
| 3,803,808 A | 4/1974 | Shibuya et al. | 96/54 |
| 3,818,678 A * | 6/1974 | Gothard | 95/75 |
| 3,839,185 A * | 10/1974 | Vicard | 204/665 |
| 3,915,676 A | 10/1975 | Reed et al. | 55/432 X |
| 4,124,359 A | 11/1978 | Geller | 55/130 |
| 4,147,522 A | 4/1979 | Gonas et al. | 55/467 X |
| 4,203,948 A | 5/1980 | Brundbjerg | 422/121 |
| 4,354,858 A | 10/1982 | Kumar et al. | 55/DIG. 5 |
| 4,357,151 A | 11/1982 | Helfritch et al. | 55/302 X |
| 4,375,364 A | 3/1983 | Van Hoesen et al. | 96/87 |
| 4,411,674 A | 10/1983 | Forgac | 55/304 |
| 4,505,795 A | 3/1985 | Alamaro | 204/179 |
| 4,657,738 A | 4/1987 | Kanter et al. | 422/186.04 |
| 4,695,358 A | 9/1987 | Mizuno et al. | 204/174 |
| 4,874,586 A | 10/1989 | Szymanski et al. | 55/380 X |
| 4,904,283 A | 2/1990 | Hovis et al. | 96/66 |
| 5,024,681 A | 6/1991 | Chang | 95/70 |
| 5,024,685 A * | 6/1991 | Torok et al. | 96/43 |
| 5,066,313 A | 11/1991 | Mallory, Sr. | 95/57 |
| 5,154,733 A | 10/1992 | Fujii et al. | 95/57 |
| 5,158,580 A | 10/1992 | Chang | 95/70 |
| 5,173,098 A | 12/1992 | Pipkom | 55/379 |
| 5,185,015 A * | 2/1993 | Searle | 96/16 |
| 5,217,511 A | 6/1993 | Plaks et al. | 55/334 X |
| 5,300,270 A | 4/1994 | Krigmont | 423/239 |
| 5,433,772 A | 7/1995 | Sikora | 96/87 |
| 5,527,569 A | 6/1996 | Hobson et al. | 55/382 X |
| 5,531,798 A | 7/1996 | Engstrom et al. | 248/77 |
| 5,547,493 A | 8/1996 | Krigmont | 96/54 |
| 5,547,496 A | 8/1996 | Hara | 96/79 |
| 5,582,632 A | 12/1996 | Nohr et al. | 95/78 |
| 5,601,791 A | 2/1997 | Plaks et al. | 422/169 |
| 5,695,549 A * | 12/1997 | Feldman et al. | 96/55 |
| 5,733,360 A * | 3/1998 | Feldman et al. | 95/78 |
| 5,938,818 A | 8/1999 | Miller | 95/63 |
| 5,944,857 A | 8/1999 | Edwards et al. | 29/25.01 |
| 5,993,738 A * | 11/1999 | Goswani | 422/22 |
| 6,149,717 A * | 11/2000 | Satyapal et al. | 96/16 |
| 6,152,988 A | 11/2000 | Plaks et al. | 95/58 |
| 6,193,782 B1 | 2/2001 | Ray | 95/4 |
| 6,221,136 B1* | 4/2001 | Liu et al. | 96/66 |
| 6,245,299 B1* | 6/2001 | Shiloh et al. | 422/121 |
| 6,247,301 B1 | 6/2001 | Brännström et al. | 60/39.12 |
| 6,294,003 B1 | 9/2001 | Ray | 96/49 |
| 6,340,379 B1 | 1/2002 | Penth et al. | 95/45 |
| 6,429,165 B1 | 8/2002 | Nastke et al. | 55/524 X |
| 6,482,371 B1 | 11/2002 | Rasmussen | 423/1 |
| 6,482,373 B1 | 11/2002 | Hannaford et al. | 423/47 |
| 6,514,315 B1 | 2/2003 | Chang | 95/70 |
| 6,517,786 B1 | 2/2003 | Best et al. | 422/186.04 |
| 6,524,369 B1 | 2/2003 | Krigmont | 95/78 |
| 6,527,834 B1 | 3/2003 | Jörder et al. | 55/524 X |
| 6,544,317 B2 | 4/2003 | Miller | 95/63 |
| 6,585,809 B1 | 7/2003 | Parsa | 96/16 |
| 6,623,544 B1 | 9/2003 | Kaura | 95/3 |
| 6,660,061 B2 * | 12/2003 | Josephson et al. | 95/2 |
| 6,869,467 B2 * | 3/2005 | Scheuch | 96/55 |
| 6,926,758 B2 * | 8/2005 | Truce | 95/78 |
| 6,932,857 B1 | 8/2005 | Krigmont | 95/63 |
| 7,105,041 B2 * | 9/2006 | Dunn | 96/66 |
| 7,112,236 B2 * | 9/2006 | Hoverson et al. | 95/78 |
| 7,264,658 B1 * | 9/2007 | Heckel et al. | 96/62 |
| 7,267,712 B2 | 9/2007 | Chang et al. | 96/77 |
| 7,270,692 B2 | 9/2007 | Gillingham et al. | 55/486 |
| 7,300,499 B1 | 11/2007 | Fleisher | 96/16 |
| 7,332,020 B2 | 2/2008 | Tanaka et al. | 96/66 |
| 2003/0177901 A1* | 9/2003 | Krigmont | 95/78 |
| 2004/0025690 A1* | 2/2004 | Krigmont | 95/78 |
| 2006/0254423 A1 | 11/2006 | Tanaka et al. | 96/66 |
| 2006/0278082 A1* | 12/2006 | Tomimatsu et al. | 96/66 |
| 2007/0068387 A1 | 3/2007 | Pletcher et al. | 96/83 |
| 2007/0157814 A1* | 7/2007 | Kim et al. | 96/61 |
| 2007/0283810 A1 | 12/2007 | Besi | 96/64 |
| 2008/0092736 A1 | 4/2008 | Krigmont et al. | 95/78 |

\* cited by examiner

SPACE EFFICIENT HYBRID AIR PURIFIER

This is a continuation-in-part of co-pending application Ser. No. 12/002,505 filed Dec. 17, 2007.

BACKGROUND

1. Field of the Invention

The present invention relates generally to the field of particulate and gas collectors and more particularly to a space efficient, hybrid collector incorporating electrostatic collectors and precipitators as well as particulate filters. The present invention is particularly attractive for air purification, exhaust after-treatment for vehicles, gas turbines and also applications such as high-tech, surgical and others that require the capture of sub-micron and nano-particles in both intake and exhaust air. Worldwide interest in gas turbine emissions and the enactment of Federal and State regulations in the United States have resulted in a need for an efficient means to control gas turbine exhaust emissions. The pollutants most generally of concern are CO, NOx, SOx, unburned hydrocarbons, soot. The present invention deals with such pollutants as unburned carbon, soot and other particulate emissions as well as pollutant gases. Additionally, the problem of purifying intake air for the combustion turbines is a matter of great importance with respect to the equipment maintenance and longevity by preventing the compression parts from being damaged by the high energy particulate impacting the rotating compression wheels.

Ultrahigh collection efficiency (>99.9999%) of submicron and nano particulate is of extreme interest in clean rooms like those used in semiconductor manufacture and the like. There is also considerable interest in killing bacteria and other organisms as well as removing particulate matter for air purifiers that might be used in surgical suits, or other applications where micro-organisms can be harmful.

2. Description of the Prior Art

Gas streams often carry particulate material. In many instances, it is desirable to remove some or all of the particulate material from a gas flow stream. Filters have been made in the past in a variety of configurations and designs, operating by mechanical or electrical entrapment of particles contained in the air stream. For example, a nonwoven or woven fibrous or filamentary web may by provided across the air flow for traversal thereby to trap dust particles in the greater-then-micron range. As is well known, such filters operate by mechanical interception of the particles, i.e. having a pore size which governs the size of particles which can be intercepted by a filter. Smaller particles traverse the filter and attempts to reduce the pore size lead only to high pressure drop and increasing impediment to has flow.

In order to achieve ultra high filtration efficiency, the prior art teaches that a very fine filter should be used (such as the type of filters called High Efficiency Particulate or HEPA filters). One of the major disadvantages of this prior art is the use of considerable energy needed to move air through the filter media. It would be a significant advantage to be able to achieve ultra high filtering efficiency without having to use such small grid filters.

Electrostatic precipitators have been proposed to alleviate this problem, the gas stream being passed through channels defined by oppositely charged plates, wires or screens, the latter representing collector electrodes which lie in arrays parallel to the direction of flow of the gas. The gas stream is subjected to a charging field, i.e., a corona discharge, and charged particulates are accumulated by absorption or dipole association with the dust particles in the gas stream. The electrically charges particles then transfer charge to the collecting electrode to this they adhere.

Some air purifiers pass an inlet air stream over one or more ionizing wires or an ionizing wire grid. The ionizing wires impart an electrical charge to the air flow, creating charged molecules known as ions, some of which eventually cling to airborne particles. In the case of air ionizers, the charged air is released as treated air. More sophisticated types of air purifiers include an electronic precipitator. Fleisher in U.S. Pat. No. 7,300,499 teaches the use of a high voltage electrostatic ionic air grid and precipitator plates for the removal of particulates together with ultraviolet light to provide germicidal properties. Kaura in U.S. Pat. No. 6,623,544 teaches treating air with mechanical filtration of particles greater than 2 micron, ionizing with energetic ions, and finally ultraviolet light to kill bacteria. Gillingham et al. teach the use of barrier media containing deposits of fine fibers in U.S. Pat. No. 7,270,692. Sikora in U.S. Pat. No. 5,433,772 teaches the use of a high voltage electrostatic filter with alternating oppositely charged plates with an ionizing wire affixed to alternate plates to remove particulates. U.S. Pat. Nos. 7,300,499, 6,623,544, 7,270,692 and 5,433,772 are hereby incorporated by reference.

Exhaust gas after-treatment in vehicles is well known in the art and is commonly used to meet emission requirements. Current after-treatment is used to remove unwanted nitrogen and sulfur compounds as well as particulate matter. In diesel systems electrostatic collectors have been used to remove suspended particulate matter including oil droplets from the blow-by gas, for example, so that blow-by gas can be returned to the atmosphere or to the fresh air intake side of the diesel engine for further combustion. Also, there are numerous applications that require ultra-filtering including the removal of sub-micron and nano-particles.

For example, the use of fossil fuel in gas turbine engines results in the combustion products consisting of carbon dioxide, water vapor, oxides of nitrogen, carbon monoxide, unburned hydrocarbons, oxides of sulfur and particulates. Of these products, carbon dioxide and water vapor are generally not considered objectionable at least as pollutants. In most applications, governmental imposed regulations are further restricting the remainder of the constituents emitted in the exhaust gases. The majority of the products of combustion emitted in the exhaust can be controlled by design modifications, cleanup of exhaust gases and/or regulating the quality of fuel used. For example, sulfur oxides could be controlled by the selection of fuels that are low in total sulfur. This leaves nitrogen oxides, carbon monoxide and unburned hydrocarbons as the emissions of primary concern in the exhaust gases emitted from the gas turbine or an automotive engine. Particulates in the engine exhaust have been controlled either by design modifications to the combustors and fuel injectors or by removing them by traps and filters.

For gas turbines, combined cycle gas turbines are generally better candidates for emissions control than simple cycle units. The main challenge in a combined cycle system is to find enough space to house the emissions control unit within the Heat Recovery Steam Generator (HRSG) in the proper temperature regime. Depending on the exhaust temperatures, simple cycle gas turbines present a somewhat more complicated challenge The lower exhaust temperature of some mature frame gas turbines which is usually well below 450° C. (842° F.) is within the operating capability of conventional technologies and materials. In a simple cycle gas turbine configuration, the emissions control system is normally located immediately downstream of the gas turbine and requires an expansion from the gas turbine outlet exhaust duct to the emissions control system.

Electrostatic collectors and particulate filters are also known in the art. In some of my previous patents, I teach systems containing these components. (Krigmont—U.S. Pat. Nos. 6,932,857; 6,524,369; 5,547,493) used to clean flue gas in power plants. U.S. Pat. Nos. 6,932,857, 6,524,369 and 5,547,493 are hereby incorporated by reference. In addition, Chang in U.S. Pat. No. 7,267,712 teaches picking up charged particles in an electric field with a filter, while others (U.S. 2005/925170, US2006/524369, U.S. 2005/322550 and U.S. 2005/492557) teach various electrostatic air cleaners.

Prior art systems are many times large and expensive and do not necessarily provide the type of filtering needed for vehicle or portable applications. It would be advantageous to have a compact, space-efficient hybrid collector that uses corona discharge to charge particles and partially collect them and the combination of porous surfaces and uniform electric fields to collect the remaining particles for use in an automotive or other vehicle exhaust emissions control system, combustion turbines or for any other space-restricted or portable use including high technology uses such as surgery and semiconductor manufacture where it is important to trap sub-micron and even nano-particles. It would also be advantageous to optionally use barrier filters known in the art to convert hazardous compounds into more benign substances.

SUMMARY OF THE INVENTION

The present invention relates to a compact, hybrid collector that overcomes the deficiencies of the prior art that can be used in air purifying, a vehicle emissions control system or in any other application where space and lower cost is important. Other embodiments of the present invention can be used to achieve ultra high filtering efficiency for applications in clean rooms, surgical suites or any other application requiring ultra-clean air. Additional embodiments of the present invention provide for subsequent purified air decontamination from chemical and biological agents by incorporating ultra-violet, x-ray or any similar radiation unit. According to the principles of the present invention, exhaust gas enters the device and is immediately exposed in a first zone to a high-tension corona discharge electric field which results in a strong ionic flow by charging the incoming effluent (oil mist, soot particles, etc.). Charged particulate begins to migrate (follow the high-tension electric field) towards the collecting electrode where it settles and retained until it is removed by any conventional means. Subsequently, the charged flow enters a second zone of high-tension uniform electric field that causes the remaining uncollected charged particles to migrate to one of the charged electrodes. One of the electrodes can be made of porous filter material that allows the cleaned gas to flow into an exit zone also containing a high-tension uniform electric field where the remaining effluent is collected prior to the clean gas exiting either to ambient air, or being re-circulated to be used again in the process. In some embodiments a dielectric barrier discharge surface can be provided to convert harmful compounds to more desirable substances. Separately, the porous dielectric surface can be also made catalytically active to convert harmful constituents into less toxic substances. Additional germicidal action can be achieved by the addition of ultraviolet light, x-ray, or any similar radiation system to dispose of harmful chemical and biological agents.

DESCRIPTION OF THE FIGURES

Attention is directed to figures that can aid in understanding the present invention.

Several drawings and illustrations have been presented to aid in understanding the present invention. The scope of the present invention is not limited to what is shown in the figures.

DESCRIPTION OF THE INVENTION

The present invention relates to a compact, space-efficient hybrid collector for use in air purification for breathing, surgical or high technology applications requiring ultra-clean air, a vehicle exhaust system, gas turbine, or in any other application where price and compactness are important. It particularly relates to ultra high efficiency air purifying. The invention is hybrid in the sense that it can combine electrostatic collection with particulate filters made of porous materials. The requirements for a space-efficient filter that could be used in an ultra-clean air purifying system or a vehicle exhaust system are high filtration efficiency, no secondary emissions, high durability, and low maintenance costs at intervals within steps of vehicle or system inspection as well as limited increase in weight and low back-pressure. Similar requirements could be applied to combustion turbines and vehicle exhaust system applications. Further use of ultraviolet light treatment or any similar means of the decontamination can also be used to kill micro-organisms or other biological agents, or remove chemical agents.

The present invention can provide a compact, space-efficient hybrid collector that improves utilization of space within a unique assembly allowing for a reduction in assembly size or an increase in flow rating for the same package size.

Figure 1:
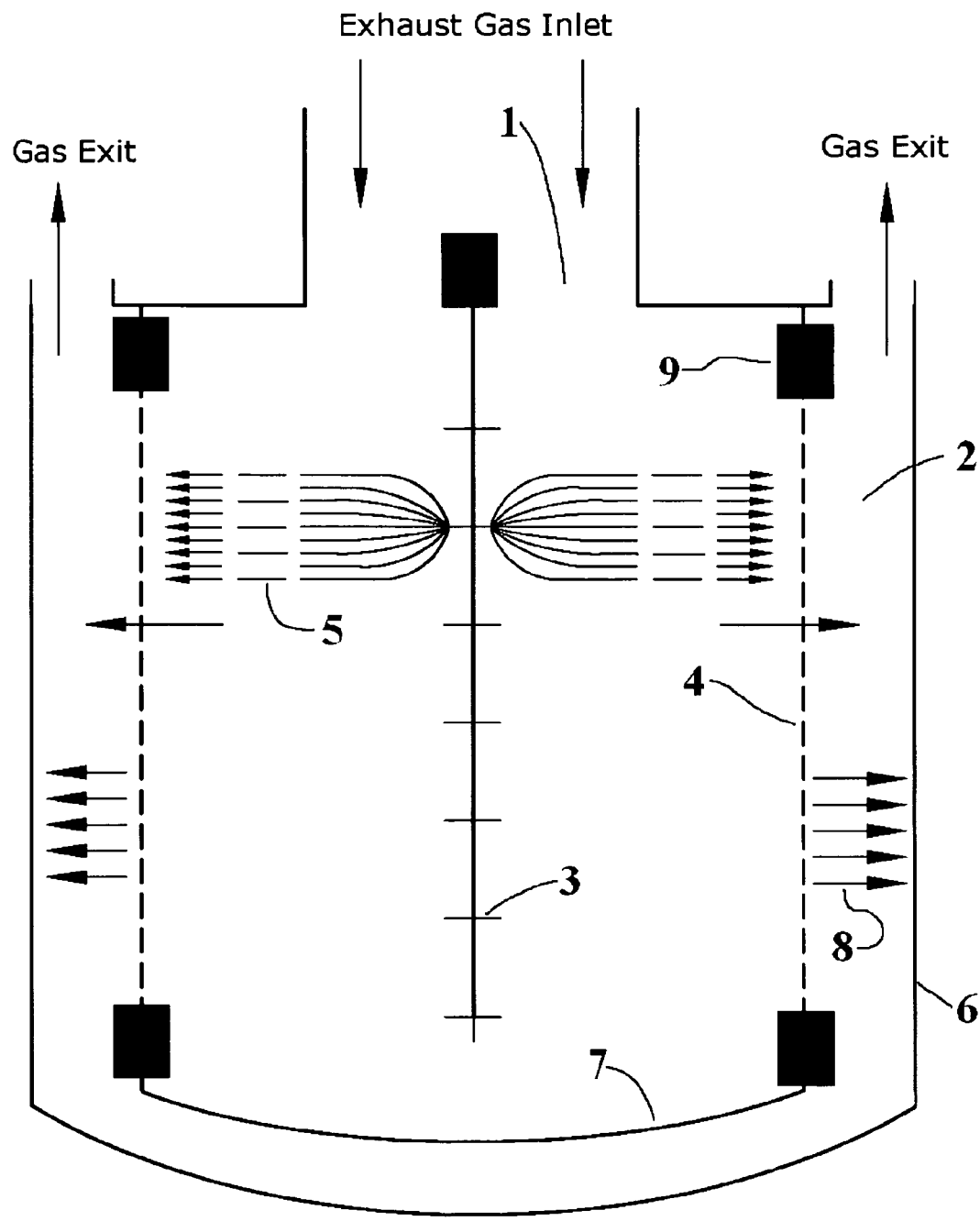
FIG. 1 shows a first embodiment of a hybrid collector where the barrier filter is used as an electrode for both the corona discharge and the uniform electric field.

Turning to FIG. 1, a first embodiment of the present invention can be seen.

An inner container with a rounded bottom 7, preferably circular or oval in cross-section, can be contained in an outer, possibly metal or other material container 6. A porous cylindrical surface 4 can be connected to insulators 9. Gas normally flows into the device through a gas inlet (top) into a first region 1 where it immediately encounters a high-tension corona discharge 5 emitted from a series of discharge points 3 located on an insulated axially centered electrode. The corona discharge 5 can be between the discharge points 3 and the porous surface 4. The discharge points 3 can be grounded or maintained at any convenient potential with respect to the porous surface 4. A high-tension potential is normally placed on the porous surface 4 with respect to the outer container 6 so that a region of uniform high intensity electric field can be formed between the concentric cylindrical porous filter 4 and the outer container 6 (which can be grounded to the vehicle frame in the case of a vehicle system).

As previously explained, particles and droplets in the incoming flow stream immediately encounter the corona discharge 5 and become charged. As the charged particles continue in the high-tension corona discharge 5, they begin to follow the electrical field towards the porous collecting electrode 4, which being charged opposite to the particulate, attracts and collects many of them. As the flow passes through the porous medium, some remaining particles are collected by the porous filter 4. On the other side of the porous surface 4, the flow emerges into an outer chamber 2 and region of uniform electric field 8. The previously charged remaining uncollected particles are typically accelerated along field lines until they reach one of the oppositely charged surfaces where they remain. It can be seen in this embodiment that the flow direction is reversed 180 degrees in the uniform field region. This allows the gas move back the entire length of the device in the uniform field region allowing maximum exposure time for particulate capture.

Figure 2:
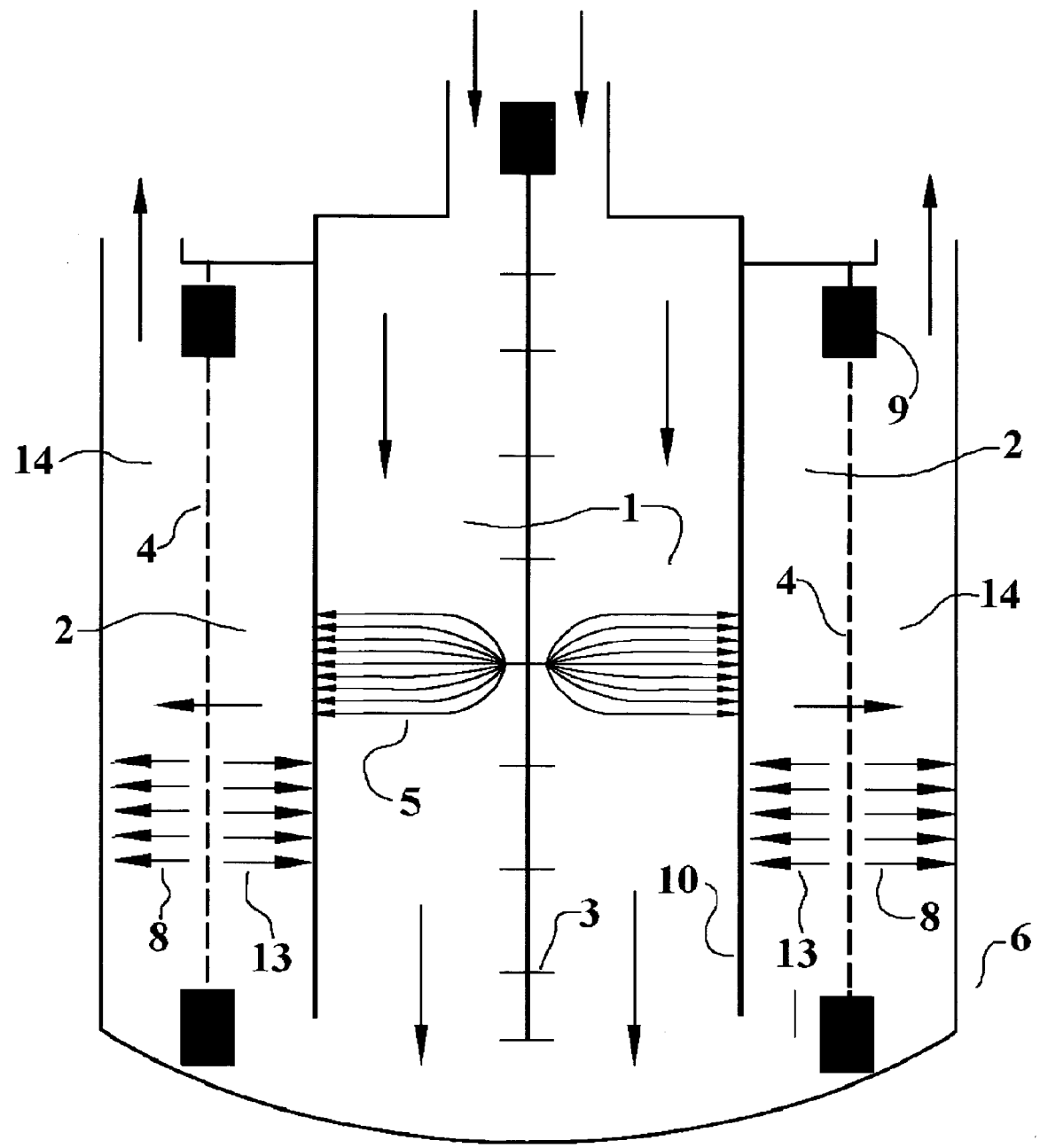
FIG. 2 shows a second embodiment of a hybrid collector where the barrier filter is used as an electrode for two separate regions of uniform electric fields.

FIG. 2 shows a second or alternate embodiment of the present invention that uses a grounded metal section 10 and an ungrounded (high-tension) axial center section with discharge points 3. Gas flow typically enters the first stage I and immediately encounters the corona discharge 5. Gases can then pass out of the bottom of this first region 10 and into a second region 2 that is divided by a cylindrical porous surface 4. In this embodiment, the gas flow normally enters into the inner compartment I where it passes through regions 5 of corona discharge. It then is typically routed by the structure into a region 2 of uniform electric field 13. From here, it can pass through a porous surface 4 and enter a second region 14 of uniform electric field 8. While the uniform electric fields 8, 13 in the two regions 2, 14 are normally the same or similar, they can also be different. It is within the scope of the present invention to use uniform fields of any field strength or configuration. The porous surface 4 is normally insulated with insulators 9 and raised to a high potential with respect to the rest of the device.

The flow on both sides of the porous surface 4 is typically subjected to two high-tension uniform electric fields. This normally causes remaining uncollected charged particles on both sides of the porous filter 4 to be captured. The gas with particulate matter enters the first zone 1, where the particulate immediately charges, and some of it becomes trapped by the grounded collecting surface 10; the remaining uncollected particles still in the gas enter the second (or next) zone with the high-tension uniform discharge 13 where a portion of the charged particulate also gets collected on either porous collecting surface 4 or the outer surface of the cylindrical grounded electrode 10. Following this, the gas can pass through the porous wall 4 (barrier filtration) to the next zone which also contains a uniform field 8. It is in this field that the final cleanup typically takes place. In the case of the embodiment shown in FIG. 2, the exit is on the same end of the device as the inlet. The embodiment shown in FIG. 2 is particularly suited to ultra high efficiency filtering at room temperature.

Figure 3:
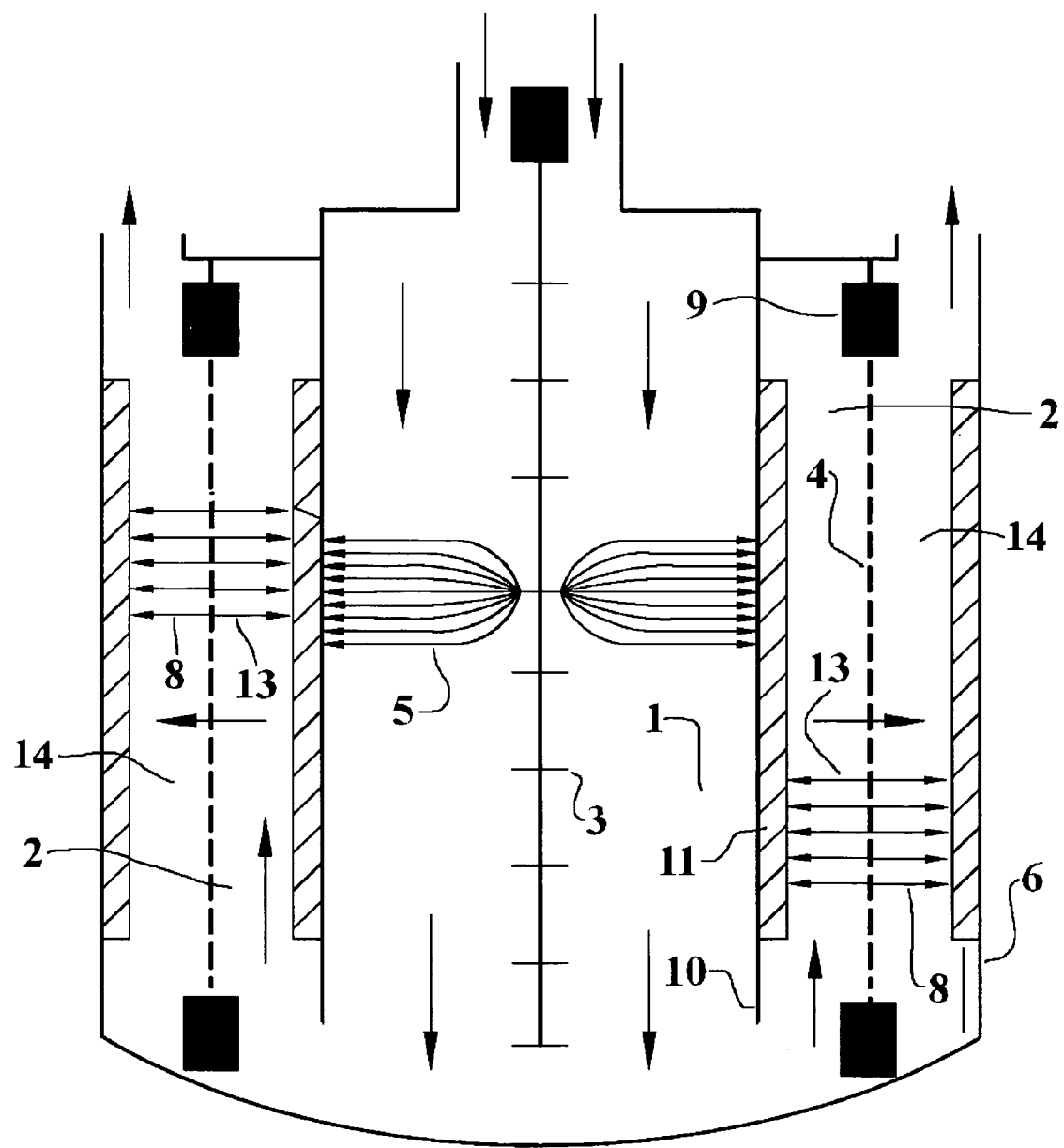
FIG. 3 shows a third embodiment that uses a dielectric layer in the regions of uniform electric fields.

FIG. 3 shows a variation of the embodiment of FIG. 2 where the inner surfaces of regions 2 and 14 are covered with a dielectric layer 11 or plates/covers. This dielectric layer can create a barrier discharge region known in the art to be able to chemically convert hazardous gases to less harmful molecules. It should be noted that this type of a barrier discharge surface can be used with any of the embodiments of the present invention. The barrier discharge is just an example of a possible process on this surface.

Figure 4A:
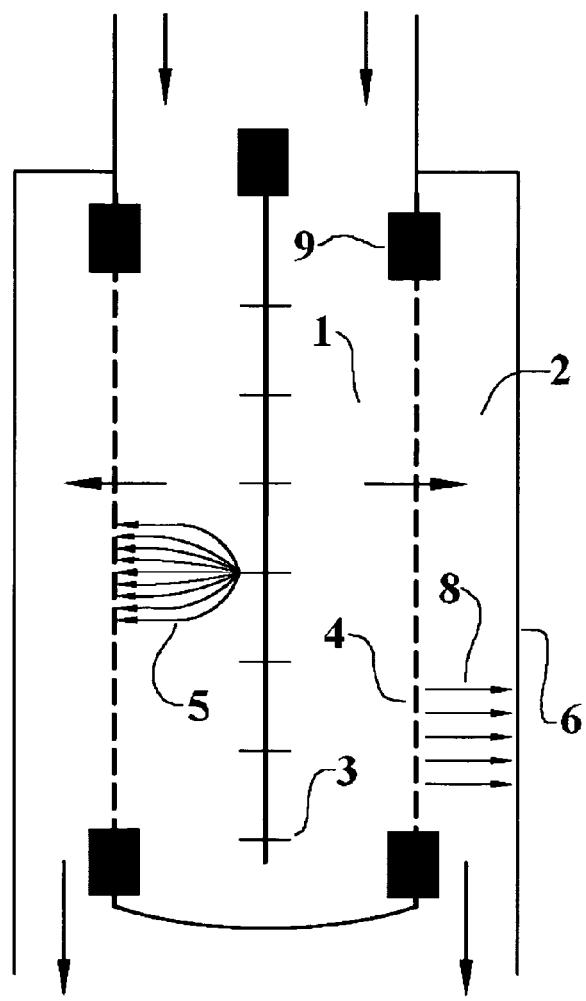
FIG. 4a shows a narrower embodiment that uses a possibly coated porous electrode.
Figure 4B:
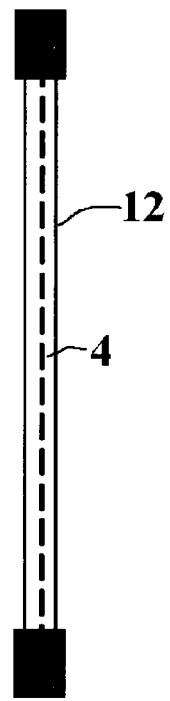
FIG. 4b shows an isolated view of a coated porous electrode.
Figure 5:
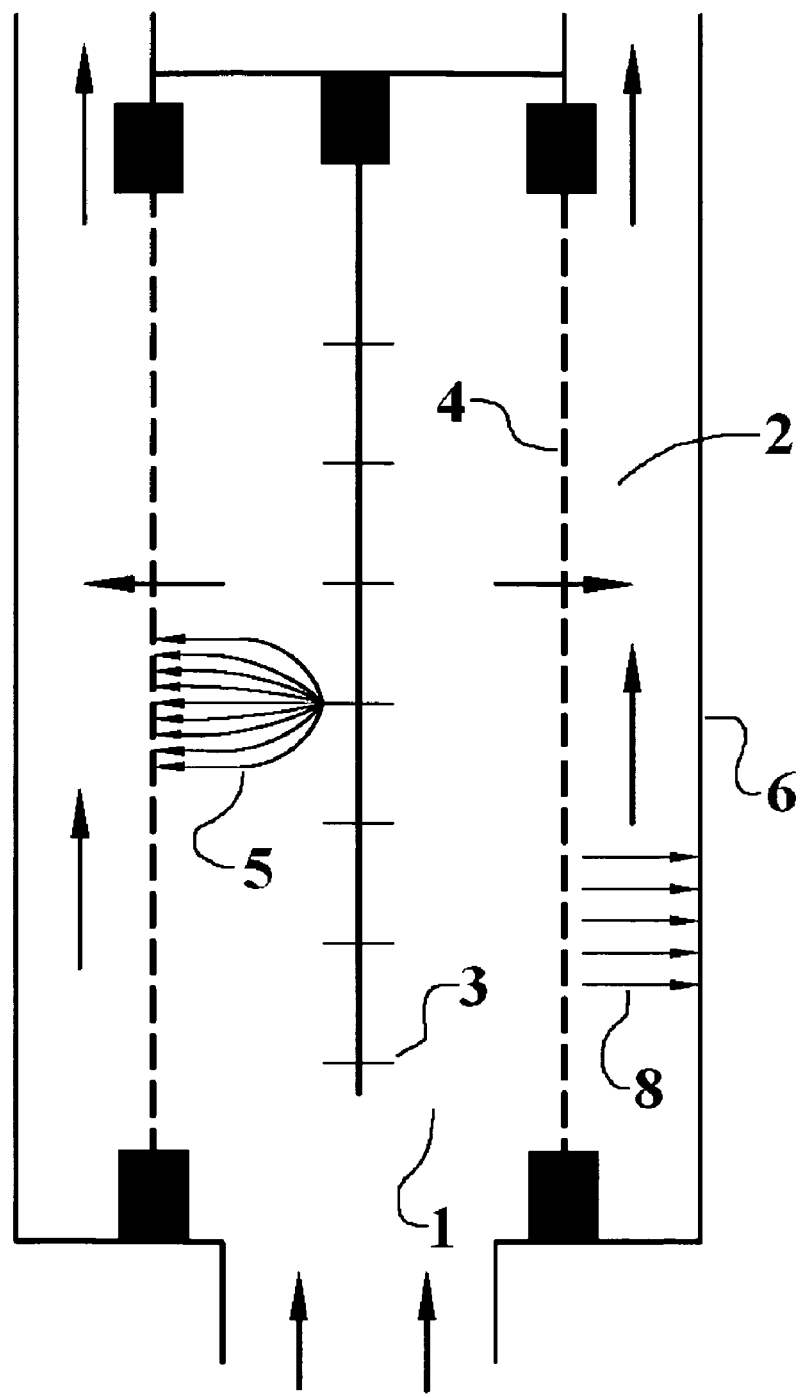
FIG. 5 shows a variation on the embodiment of FIG. 4.

FIGS. 4a and 5 show other versions of the present invention that operate very similarly to the embodiment of FIG. 1 except that they are flow-through in that the flow does not reverse direction after passing through the porous surface 4. Both of these embodiments use two regions 1, 2 separated by the porous surface 4. The inner region I subjects the flow to a corona discharge 5, and the outer region 2 subjects the flow to a uniform electric field 8. The porous surface 4 can be coated to promote chemical activity. FIG. 4b shows a view of a coated porous surface 4. The chemical coating 12 can be a catalyst applied as a wash coat by submerging the porous surface in it, or it can be applied by spraying or any other method. In particular, this catalytic surface can convert harmful gases such as nitrogen or sulfur compounds in the presence, for example ammonia, into less harmful substances or into substances that are easily collected. The catalytic material can be based on vanadium pentoxide or other catalytically active material with respect to NOx, CO or other gaseous pollutants. This technique is especially attractive for combustion gas and gas turbines where the gas flow is hot enough to activate the catalyst. In some instances, addition of ammonia known in the art to promote catalytic reaction may be optionally used.

It should be noted in the various embodiments, that while a cylindrical embodiment is preferred, especially for vehicle applications, any of the embodiments could be used with an oval, rectangular, hexagonal or octagonal cross-section or any other cross-section. The devices can also be packaged conveniently using outer protective layers if necessary to prevent corrosion and with fittings to provide for easy mounting. The devices can be metal, plastic, ceramic or any other suitable material. Any cross-section or packaging is within the scope of the present invention as well as any material that is strong and can withstand high temperatures. Combinations of various materials such as ceramic, metals, fused metals or alloys and plastic may also be used. Any of the embodiments of the present invention can be operated using either AC or DC voltages and at various different potentials known in the art. In the case of a vehicle, the potential can be supplied by a high voltage generator that is powered from the vehicle's battery.

Figure 6:
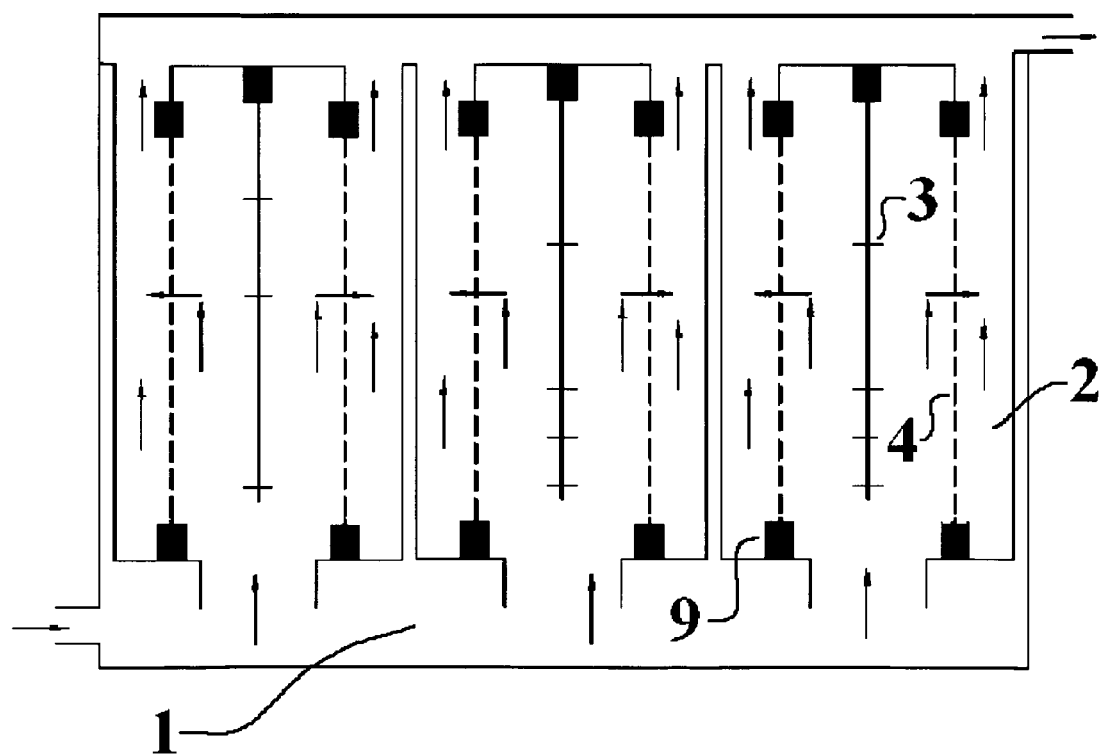
FIG. 6 shows a repeating multi-zone embodiment.

FIG. 6 shows an embodiment of the invention that uses a multi-unit parallel approach to allow for the treatment of larger gas volumes. This embodiment is particularly useful in applications involving combustion or gas turbines. Gas enters through an entrance into region 1 and can pass through one of several different corona discharge areas where corona is initiated from corona electrodes 3. In each parallel section, gas can pass through a porous surface 4 and into a region of uniform electric field 2 before exiting the device. All of the modifications discussed in previous embodiments such as coated surfaces, barrier discharge regions and multiple regions of uniform field can be used the a parallel arrangement similar to the embodiment shown in FIG. 6.

Figure 7:
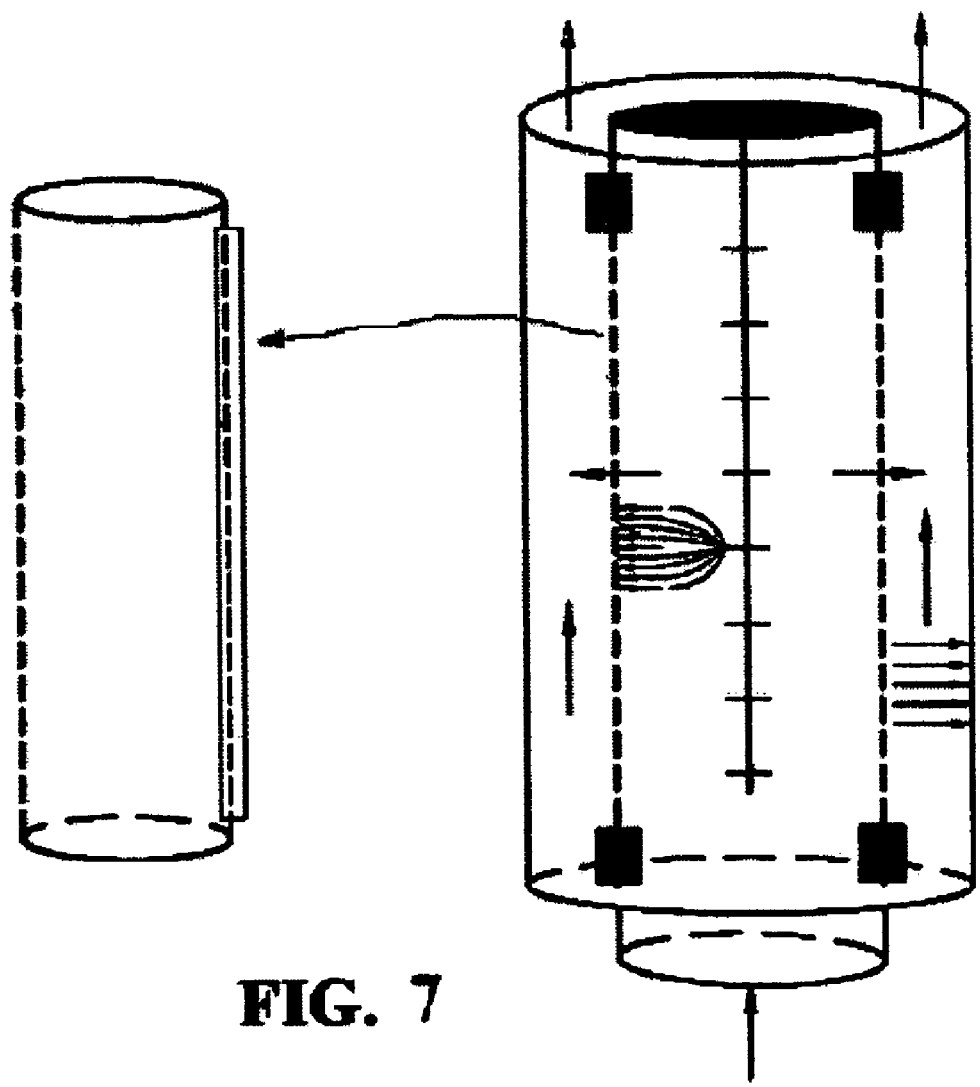
FIG. 7 is a perspective view of the embodiment of FIGS. 4a and 4b.
Figure 8:
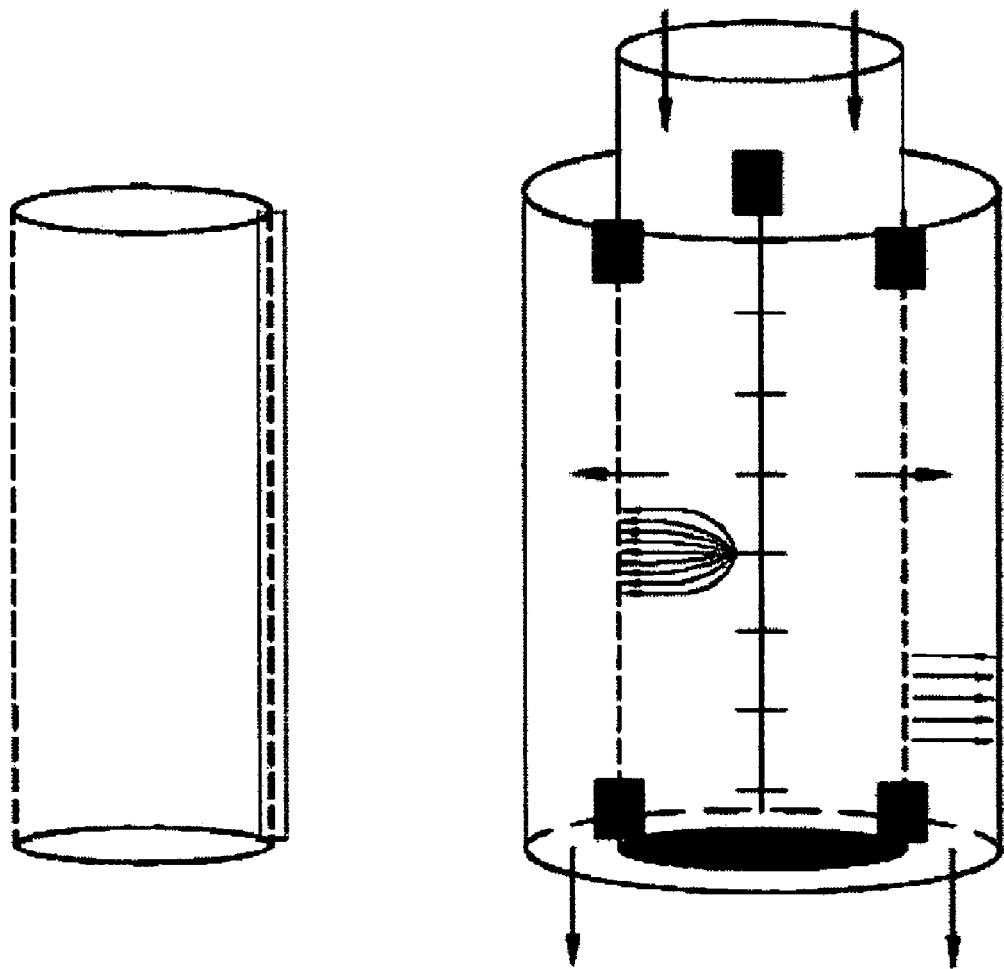
FIG. 8 is a perspective view of the embodiment of FIG. 5.

FIG. 7 shows a perspective view of the embodiment of FIGS. 4a-4b, and FIG. 8 shows a perspective view of the embodiment of FIG. 5.

Figure 9:
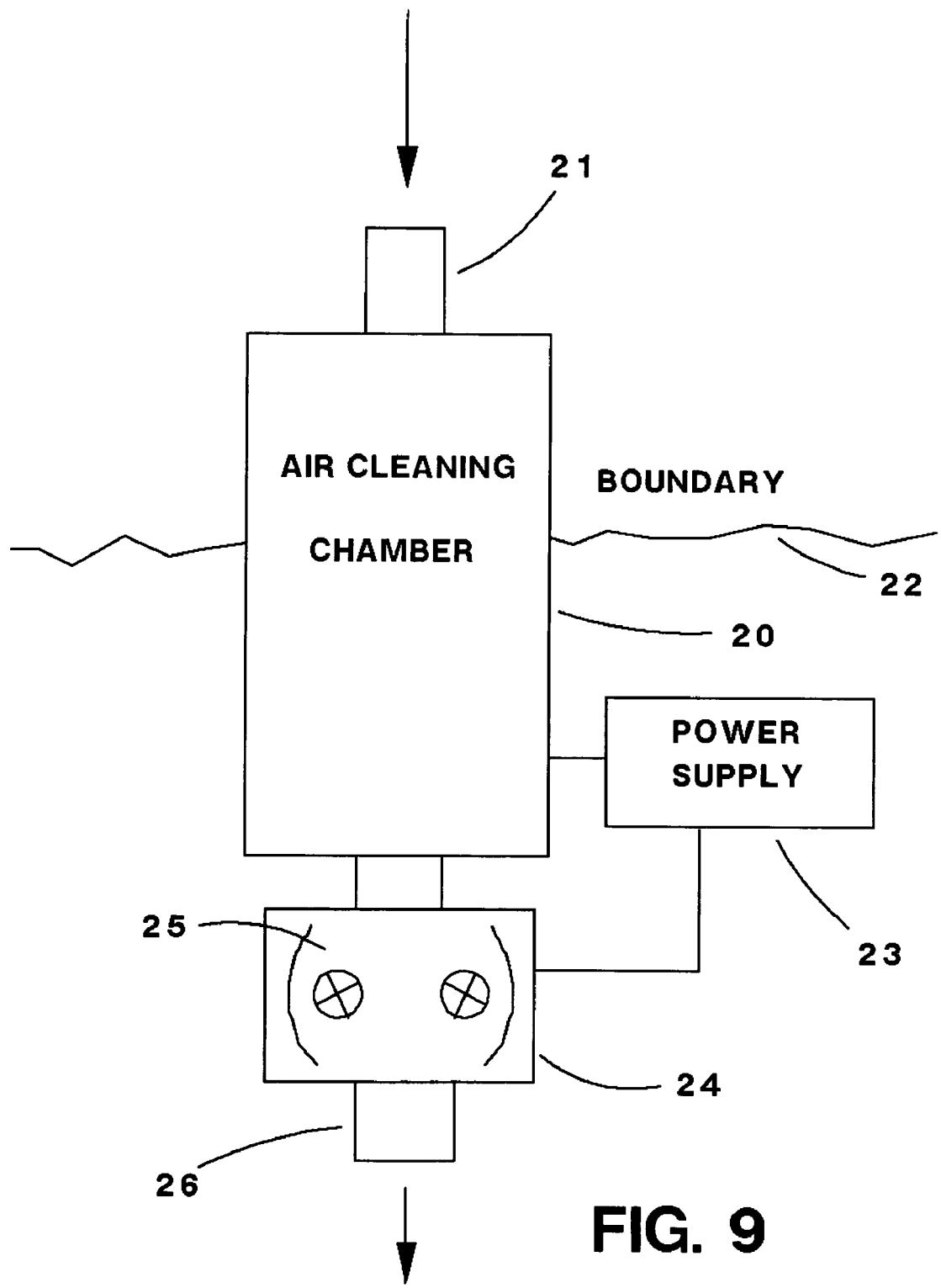
FIG. 9 is a diagram of an embodiment of the present invention with a power supply and decontamination chamber.

Turning to FIG. 9, a diagram of an embodiment of a system of the present invention can be seen. Air flow enters an input port 21 on one side of a boundary 22. The flow enters an air cleaning chamber 20 where it is subjected to corona discharge, static electric fields and barrier filtering as previously described. A power supply 23 drives the high tension required for the corona discharge and static electric field. The flow exits the air cleaning chamber 20 and enters an optional decontamination chamber 24 where it can be subjected to ultraviolet light, x-rays, radiation such as gamma rays or beta rays (electrons), or other radiation, or any other means of killing micro-organisms like bacteria supplied by a generator or light 25. From the decontamination chamber 24, the clean are exits a clean air port 26 into the clean environment. This embodiment may be used to provide ultra-clean air to a clean room or other area where nano-sized particles and living organisms must be removed.

Several descriptions and illustrations have been provided to aid in the understanding of the present invention. One with skill in the art will realize that numerous changes and variations are possible without departing from the spirit of the invention. Each of these changes and variations is within the scope of the present invention.

I claim:

1. A compact hybrid air-purifier system comprising:
a first region containing a high-tension corona discharge;
a second region separated from said first region containing a first high-tension substantially uniform electric field;
a third region separated from said second region by a porous surface, said third region containing a second high-tension substantially uniform electric field;
and wherein gas flow enters said first region where particles in said gas flow become charged by said corona discharge; and the gas flow enters said second region where particles in the gas are removed by said first high-tension electric field, and wherein the gas flow passes through said porous surface into said third region where particles are removed by said second high-tension electric field.

2. The compact hybrid air purifier system of claim 1 wherein portions of surfaces defining said second and third regions are coated with a dielectric.

3. The compact hybrid air-purifier system of claim 1 wherein said first, second and third regions are cylindrically shaped.

4. The compact hybrid air-purifier system of claim 1 further comprising a central electrode with discharge points for forming said corona discharge.

5. The compact hybrid air-purifier system of claim 4 wherein said porous surface is raised to a high electric potential with respect to said central electrode.

6. The compact hybrid air-purifier system of claim 1 further comprising an enclosure containing said system made of a material selected from the group consisting of metal, fused metal, metal alloys, plastic and ceramic.

7. The compact hybrid air-purifier system of claim 1 further comprising a decontamination chamber.

8. The compact hybrid air-purifier system of claim 7 wherein said decontamination chamber contains decontamination apparatus for killing micro-organisms.

9. The compact hybrid air-purifier system of claim 8 wherein said decontamination apparatus is chosen from the group consisting of ultraviolet light, x-ray and radiation.

10. A hybrid collector system comprising a first region where a gas flow passes through a plurality of corona discharges, a second region where said gas flow passes through a first substantially uniform electric field and a third region where said gas flow passes through a second substantially uniform electric field, and wherein said second and third regions are separated by a porous surface, and further comprising a decontamination chamber which said gas flow passes subsequently to passing through said first, second and third regions.

11. The compact hybrid collector system of claim 10 wherein said decontamination chamber contains decontamination apparatus for killing micro-organisms.

12. The compact hybrid collector system of claim 11 wherein said decontamination apparatus is chosen from the group consisting of ultraviolet light, x-ray and radiation.

13. The compact hybrid collector system of claim 10 wherein surfaces of said second and third regions are coated with a dielectric.

14. A compact hybrid air-purifier system comprising:
a first region containing a high-tension corona discharge;
a second region separated from said first region containing a first high-tension substantially uniform electric field;
a third region separated from said second region by a porous surface, said third region containing a second high-tension substantially uniform electric field;
a fourth region containing a decontamination apparatus;
and wherein gas flow enters said first region where particles in said gas flow become charged by said corona discharge; and the gas flow enters said second region where particles in the gas are removed by said first high-tension electric field, and wherein the gas flow passes through said porous surface into said third region where particles are removed by said second high-tension electric field.

15. The hybrid air-purifier of claim 14 wherein said decontamination apparatus includes an ultraviolet light source.

16. The hybrid air-purifier of claim 14 wherein said decontamination apparatus is chosen from the group consisting of a light source, an x-ray source and a radiation source.

17. The hybrid air-purifier of claim 14 further comprising a power supply.

18. The compact hybrid collector system of claim 14 wherein surfaces of said second and third regions are coated with a dielectric.

* * * * *